Patented Jan. 12, 1960

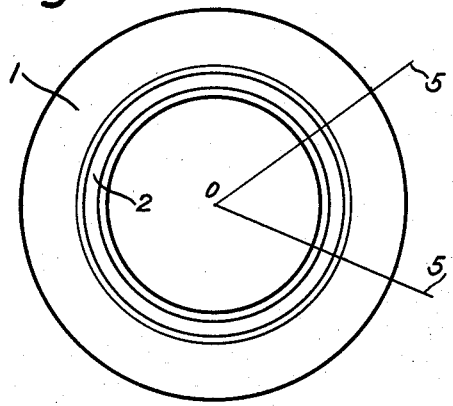
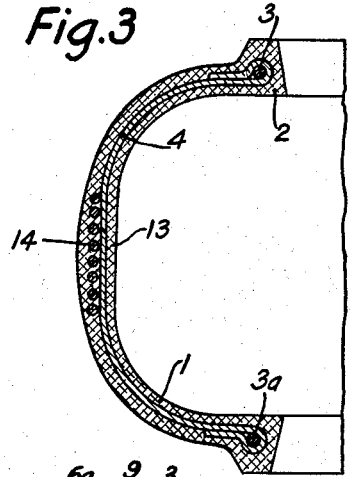
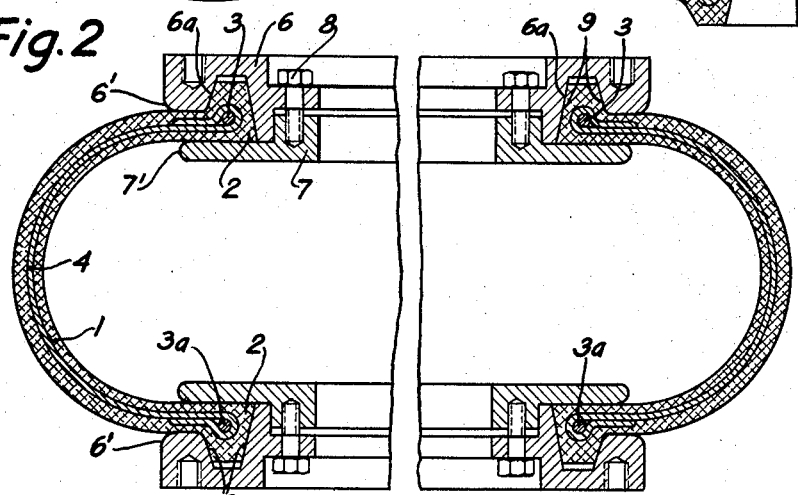
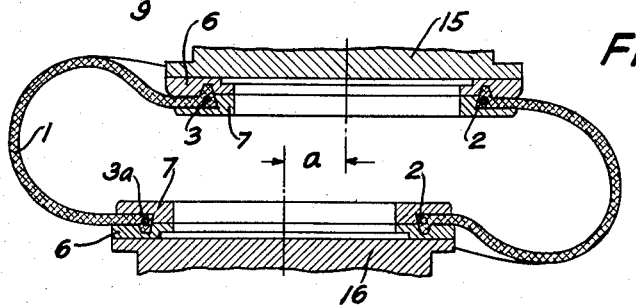
INVENTOR
WALTER NICLAS

2,920,885

HOLLOW BODIES FOR AIR CUSHIONING IN PARTICULAR FOR VEHICLES

Walter Niclas, Hannover, Germany, assignor to Continental Gummi-Werke A.G., Hannover, Germany, a corporation of Germany Application December 14, 1955, Serial No. 553,141

Claims priority, application Germany December 14, 1954

2 Claims. (Cl. 267—65)

This invention relates to torus-shaped hollow bodies which are suitable for air cushioning vehicles; they are particularly useful for achieving spring suspension of rail vehicles, but may also be used for other vehicles such as motor cars, trucks, and the like. A hollow body according to this invention consists essentially or rubber, or the like elastic material and is provided with reinforcing elements embedded in the rubber or the like material and anchored at the beads provided at the two inner edges of the toroidal body.

It is an object of my invention to provide a toroidal hollow body for air cushioning parts of vehicles which are to be spring suspended relative to one another and subject to displacement in a straight-lined stock movement as well as angular rotational displacements.

It is another object of my invention to provide a toroidal hollow body wherein the reinforcing elements in the hollow body are not forced to carry out distortional movements about to destroy their structure, although the hollow body in which the aforesaid reinforcing elements are embedded may be subjected to any deforming movement.

It is a further object of my invention to provide toroidal hollow bodies for air cushioning or similar spring suspension, which toroidal hollow bodies are provided with reinforcing elements, the lifetime of which is greatly prolonged over that of the conventional hollow bodies.

It is finally an object of my invention to provide hollow bodies for use as spring suspension members between a vehicle under frame and articulated bogies, the bogies being permitted to carry out considerable angular movements relative to the under frame of the vehicle without damaging the hollow body or destroying the reinforcing elements in the latter.

These and other objects and advantages are achieved by providing an annular toroidal hollow body according to my invention with reinforcing elements embedded in the rubber or the like material forming the hollow body, in such a manner that they are disposed in radial direction to the annular hollow body, i.e. that they are arranged in planes which are radial to the main center axis of the annular body. By providing the annular toroidal hollow body with reinforcing elements in the manner just described, the body becomes capable of supporting high internal pressures and large mechanical stresses, and permits in particular the use of such annular bodies in air cushioning or spring suspension systems wherein the parts to be spring suspended or cushioned relative to one another are displaced with regard to each other by straight line reciprocating movements as well as angular rotational displacements. It is due to the particular manner in which the reinforcing elements are arranged according to my invention in the hollow bodies that at random movements of the parts air cushioned or spring suspended by these hollow bodies, and at corresponding deformations of the hollow bodies themselves, the reinforcing elements in the hollow bodies are not subject to destructional distortions, because in the arrangement according to my invention, the reinforcing elements are only subject to tractive and bending stresses but not to tensile stresses which would detrimentally influence the reinforcing elements embedded in the hollow body in a conventional manner.

Hollow bodies according to my invention can be used advantageously for spring suspending vehicles, for instance by attaching one end edge of the hollow body to the under frame of a carriage and the opposite end edge to the bogie of the vehicle. By using hollow bodies according to my invention, the bogie is permitted to carry out considerable angular rotational displacements relative to the under frame of the carriage without damaging the hollow body or the reinforcing elements embedded therein. Due to the radial arrangement of the reinforcing elements in the hollow body, the latter can follow all displacements of the bogie relative to the under frame of the carriage with perfect ease.

The reinforcing elements to be used in the annular hollow body according to my invention may consist of threads, bands or strips of natural or artificial origin. However, I prefer to use only such reinforcing elements which are not interwoven with one another by connecting elements which contribute to the resistance to bending of the walls of the hollow body. If, on the other hand, the threads or bands are only connected to one another by means of weft threads, they can be embedded in the hollow bodies according to my invention as reinforcing elements therefor since such weft threads do not substantially contribute to the resistance of the walls of the hollow body to deformation.

Instead of using a single hollow body according to my invention for air cushioning or spring suspending two parts against one another, the same advantageous effect may also be achieved by using several hollow bodies arranged in series.

According to a further embodiment of my invention, a plurality of such bodies are built as a single body forming a combination of several toroidal elements so that the wall of the resulting hollow body is of undulating shape.

The end edges of the hollow body according to my invention may be connected in any desired manner with the parts to be spring suspended relative to one another or with intermediary elements directly in contact with, or connected to those parts. A connection between the ends of the hollow body and these parts is preferably effected by jamming, wedging or clamping the end edges of the hollow body into corresponding recesses in the intermediary members of the parts themselves. In order to provide a particularly satisfactory mechanical anchoring of the ends of the hollow body in the part to be suspended, I provide the end edges of the hollow body with a thickened rim or bead, each bead being provided in turn with one or several bead cores of great tensile strength such as for instance steel wires. These bead cores may in turn serve for anchoring the ends of the radially disposed reinforcing elements.

In a further preferred embodiment of my invention, the beads at the ends of the hollow body are wedge-shaped. They may then be introduced in a conventional manner with the aid of known straining or seating bodies into corresponding wedge-shaped grooves provided in the parts to be cushioned relative to one another.

The nature of my invention will appear more clearly from the following description in connection with the accompanying drawings in which:

Fig. 1 is a side view of a toroidal hollow body according to my invention;

Fig. 2 is a cross sectional view of Fig. 1;

Fig. 3 shows a partial cross section of a further embodiment of the hollow body according to my invention; and Fig. 4 shows the hollow body as shown in Figs. 1 and 2, when used as a cushioning or spring suspension member between two parts, and in a deformed state.

Referring now to the drawings more in detail and in particular to Figs. 1 and 2, reference numeral 1 designates the hollow body according to my invention which is provided at its ends with wedge-shaped beads 2, in which there are embedded bead cores 3, 3a consisting each of a plurality of steel wires. Thread-shaped reinforcing elements 4 are embedded in the wall of the hollow body 1, which elements 4 are anchored at the bead cores 3, 3a and extend in radial planes 5 relative to a center axis O (in Fig. 1). The reinforcing elements extend from the bead core 3 on one side of the toroidal body to the bead core 3a embedded in the opposite end bead of the body. Metal rings 6 are provided with annular wedge-shaped grooves 6a for receiving the wedge-shaped beads 2 of the toroidal body therein. The beads 2 are held in place in the grooves 6a with the aid of a clamping plate 7 of L-shape cross section which is screw connected with the metal rings 6 by means of bolts 8. The wedge-shaped beads 2 are provided with tapered surface areas 9 which fit into corresponding surfaces in the groove 6a of the metal ring 6, and are brought into engagement with the latter when the screw connection between ring 6 and plate 7 is tightened. The tapered surface areas 9 extend substantially in the direction of the center axis of the hollow body.

As shown in Fig. 4, the fastening ring 6 is mounted in any suitable known manner to the adjacent part 15 of the carriage under frame on the one hand and to the bogie 16 on the other hand. These parts must completely cover and seal the opening of the ring 6 in order to provide a sealed container and achieve an air cushioning effect in the hollow body 1.

Of course, it is also possible to fill the interior of the toroidal body 1 with any suitable pressure medium.

When the bogie 16 is angularly and/or transversely displaced relative to the carriage under frame so that the beads on opposite sides of the hollow body are no longer in coaxial position but are displaced transversely, for instance by the distance a, the hollow body is deformed in the manner shown in Fig. 4. However, due to the radial position of the reinforcing elements 4 in the hollow body 1, damage to the elements 4 is avoided since they are only subject to bending stresses.

It is furthermore preferred to taper the edges at 6' of the rings 6 and 7' of the plate 7 in order to prevent damage of the body 1 due to cutting or notch effects when the body 1 is subjected to strong deformation.

If necessary, the hollow body 1 can be provided with a substantially cylindrical central portion 13, as shown in the embodiment illustrated in Fig. 3. This central portion 13 contains additional reinforcements in the form of thread or wire-shaped elements 14 forming windings around the entire wall of the hollow body 1 in substantially circumferential direction. These elements 14 are not interwoven with the reinforcing elements 4 in order to avoid mutually influencing of the reinforcing effect of both types of elements. It is preferred to limit the length of the central portion in axial direction sufficiently to avoid any substantial restriction in the deformability of the hollow body 1. This deformability then depends upon flexibility of the wall portions above and below the specially reinforced central portion 13 of the hollow body.

It is mentioned that in the air chamber rubber bumpers may be provided to prevent injury to the body 1 under excessive load or because of insufficient air pressure in the spring assembly. The chamber may be charged with air or any suitable pressure medium at the desired pressure from outside sources. There may be an additional or auxiliary non-elastic chamber, too, connected with the chamber surrounded by the body 1.

It is, of course, understood that the present invention is by no means limited to the particular constructions shown in the drawings, but, also comprises any modifications within the scope of the appended claims.

I claim:

1. A suspension for mounting between the frame and running gear of a vehicle and comprising a flexible tubeless torus of rubber-like material having an annular opening in its inner peripheral surface, a plurality of thread-like reinforcing elements embedded in the wall of said torus and positioned in radially extending planes thereof, a plurality of thread-like reinforcing elements disposd annularly in the region of the center of said torus, said radial reinforcing elements and annular reinforcing elements being arranged in separate layers, a bead on each edge of said annular opening, an inner ring engaging the inner face of each of said beads, an outer ring having an annular groove therein to receive said bead and sealingly engaging the outer face of each of said beads, means for clamping each outer ring to its corresponding inner ring, and means sealingly engaging said outer rings to form a sealed chamber with said torus and to mount said torus between said frame and running gear of the vehicle.

2. In a suspension system for vehicles and the like, a flexible tubeless torus of rubber-like material having an annular opening in its inner peripheral surface, a plurality of thread-like reinforcing elements embedded in the wall of said torus and positioned in radially extending planes thereof, a bead on each edge of said annular opening, said beads having a wedge-like cross section, bead wires in the beads connected to the ends of said elements, an inner ring engaging the inner face of each of said beads, an outer ring having an annular recess having a configuration to correspond to and closely receive each of said beads in sealing relation, means for clamping each outer ring to its corresponding inner ring, and means sealingly engaging said outer rings to form a sealed chamber with said torus and to mount said torus between said frame and running gear of the vehicle.

References Cited in the file of this patent

UNITED STATES PATENTS

| | | |
|---|---|---|
| 971,583 | Bell | Oct. 4, 1910 |
| 1,219,420 | Archer | Mar. 20, 1917 |
| 2,115,072 | Hunt et al. | Apr. 26, 1938 |
| 2,427,927 | Schutte | Sept. 23, 1947 |
| 2,470,676 | Aldous | May 17, 1949 |
| 2,493,614 | Bourdon | Jan. 3, 1950 |
| 2,537,637 | Candlin et al. | Jan. 9, 1951 |

FOREIGN PATENTS

| | | |
|---|---|---|
| 700,435 | Great Britain | Dec. 2, 1953 |
| 726,810 | Great Britain | Mar. 23, 1955 |